United States Patent [19]
Marcoux

[11] 3,760,352
[45] Sept. 18, 1973

[54] LIQUID LEVEL INDICATING SYSTEM
[75] Inventor: Leo Marcoux, Rehoboth, Mass.
[73] Assignee: Texas Instruments Incorporated, Dallas, Tex.
[22] Filed: July 6, 1971
[21] Appl. No.: 159,894

[52] U.S. Cl. ............... 340/59, 340/244 E, 137/392, 73/295
[51] Int. Cl. ............................................ G08b 21/00
[58] Field of Search ............. 340/59, 244 R, 244 C, 340/244 E; 73/204, 295, 308; 137/392

[56] References Cited
UNITED STATES PATENTS
2,928,037 3/1960 Lawrence ..................... 137/392 X
2,926,299 2/1960 Rogoff ........................... 137/392 X
3,283,576 11/1966 Halpin et al. ....................... 73/295

Primary Examiner—Alvin H. Waring
Attorney—Harold Levine et al.

[57] ABSTRACT
One or more liquid level sensors in the form of positive temperature coefficient (PTC) of resistivity elements suspended in probes are mounted in a fluid reservoir. The elements, electrically connected in a circuit, are either in a low or high resistance mode. When the elements are in a low resistance mode sufficient current passes through respective heaters to cause respective heat responsive, normally closed, switches connected to a liquid level indicator, to open. Initially upon energization of the system, the PTC elements are in the low resistance mode and the indicator is actuated until the switches receive sufficient heat to cause them to open. The PTC elements remain in the low resistance mode as long as the liquid level remains above the elements permitting heat generated in the elements to be dissipated; however, if the liquid level recedes sufficiently to expose the elements their temperature will rise until an anomaly point is reached beyond which resistance rapidly increases shutting off current to the heaters, permitting reclosing of the switches and reactuation of the indicator. The invention is particularly suited for use with a master cylinder of a vehicle as an indicator of an insufficient quantity of brake fluid in the braking system.

13 Claims, 14 Drawing Figures

Inventor
by Leo Marcoux
by John C. Haug
Atty.

Inventor
by Leo Marcoux
John C. Haug
Att'y.

Inventor
by  Leo Marcoux
John C. Haug
Att'y.

Inventor by Leo Marcoux

John C. Haug
Att'y.

3,760,352

LIQUID LEVEL INDICATING SYSTEM

BACKGROUND OF THE INVENTION

The present invention relates to fluid level sensing and indicating and more particularly to apparatus for sensing and indicating vehicular brake fluid level.

In recent years there has been a much greater awareness of providing safety features in consumer products and particularly in automobiles. Among the many areas in which great effort is being expended to render the automobile a safer mechanism is in the braking system. It has become apparent that there is a need to provide for the operator of the vehicle positive indication of the presence of adequate braking fluid in the braking system. To be fully acceptable such apparatus providing this indication should have certain characteristics, inter alia, the apparatus should be reliable yet should not add significantly to the cost of the vehicle. Further, the apparatus should be fail safe, that is if the apparatus should fail in some way, there should be a way to make this known to the operator of the vehicle.

Various attempts have been made to provide brake fluid level indication ranging from mechanical to solid state versions. However, they all have some characteristics which detract from their acceptability.

A mechanical float mounted within the master cylinder has been suggested in conjuction with some type of switch such as a magnetic switch which is actuated on or off when the brake fluid level reaches a predetermined level. Although this apparatus is relatively inexpensive, it is sensitive to the motion of the vehicle and provides no indication when the apparatus is not functioning properly.

Another approach has been to use a thermistor having a negative coefficient of resistivity mounted within the fluid reservoir and connected to a light bulb. When the fluid level drops below the thermistor, the resistance of the thermistor decreases thereby causing the light to turn on. This system is temperature sensitive and various measures must be taken to avoid runaway of the thermistor.

Yet another approach is a pressure sensitive device in the reservoir such as a diaphragm used in conjunction with a switch. As the liquid level drops a spring biased member makes electrical contact causing a light to turn on. This system has several disadvantages such as requiring a large reservoir to permit room for the switch assembly, does not have means to determine if the system is operational, is dependent upon an effective diaphragm seal and must be reset manually.

Another suggested system employs fibre optics with light reflected by a prism if sufficient fluid is present in the reservoir. This system however is relatively expensive due to the high cost of the glass fibre and provides no means to indicate if the light bulb burns out or if the glass fibre breaks.

Yet another system relies on the electrical conductivity of the brake fluid. The use of this system would require that a particular type of brake fluid be used in a given vehicle throughout its life. Fluids of this type now available are hygroscopic so that maintaining calibration is a problem. Further, using the fluid continually to conduct electricity creates a potential problem of corrosion.

SUMMARY OF THE INVENTION

Thus it is an object of the present invention to provide apparatus which will sense and indicate the presence of sufficient quantity of brake fluid in the braking system of a vehicle which avoid the limitations of the apparatus mentioned above.

Another object of the invention is the provision of apparatus for sensing and indicating the level of fluid in a reservoir which is fail safe in operation, yet simple and relatively inexpensive to produce.

Another object of the invention is to provide apparatus for detecting a condition of vehicular brake fluid which is easily adaptable to any vehicle and any brake fluid and one in which positive means are provided to show that the apparatus is operational.

Another object of the invention is the provision of apparatus for sensing liquid level which is relatively insensitive to wide changes in ambient temperature and supply voltage.

The invention accordingly comprises the elements and combinations of elements, features of construction and arrangements of parts which will be exemplified in the structures hereinafter described, and the scope of the application of which will be indicated in the appended claims.

BRIEF DESCRIPTION OF THE DRAWING

In the accompanying drawings, in which several of the various possible embodiments are illustrated.

Figure 1:
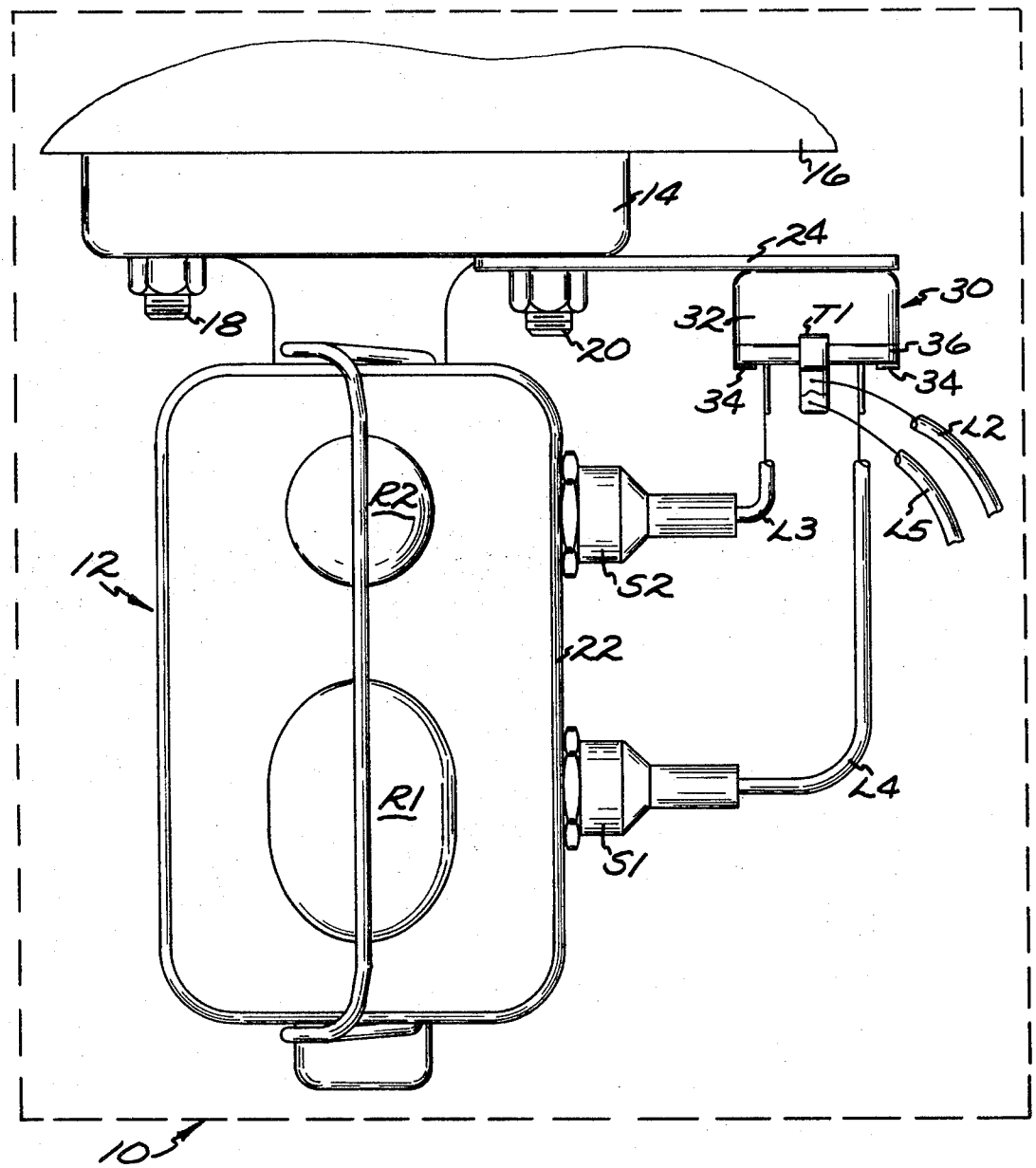
FIG. 1 is a top plan view of a vehicular brake fluid master cylinder including apparatus of the present invention for sensing the brake fluid level.

Dimensions of certain of the parts as shown in the drawings may have been modified for the purpose of clarity of illustration.

Similar reference characters indicate corresponding parts throughout the several views of the drawings.

DESCRIPTION OF THE PREFERRED EMBODIMENTS

Figure 2:
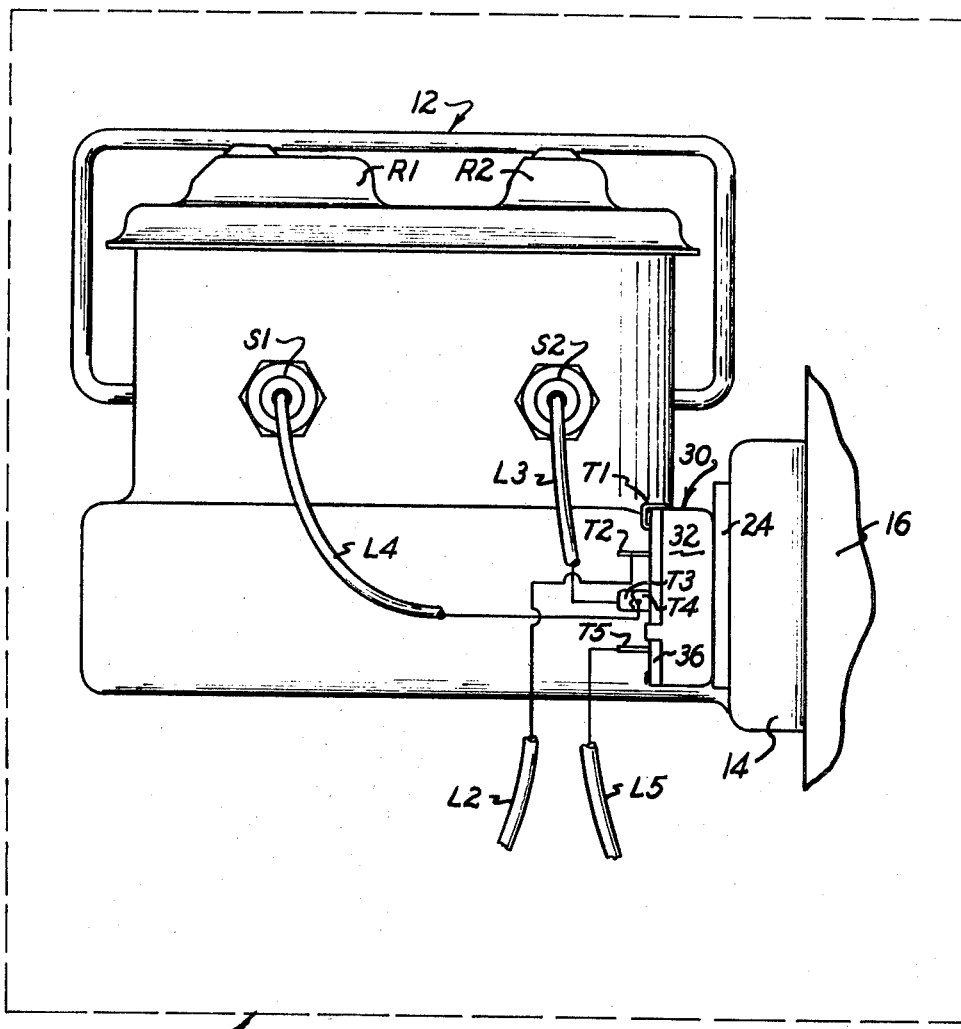
FIG. 2 is a side view of the FIG. 1 master cylinder and fluid level sensing apparatus.
Figure 5:
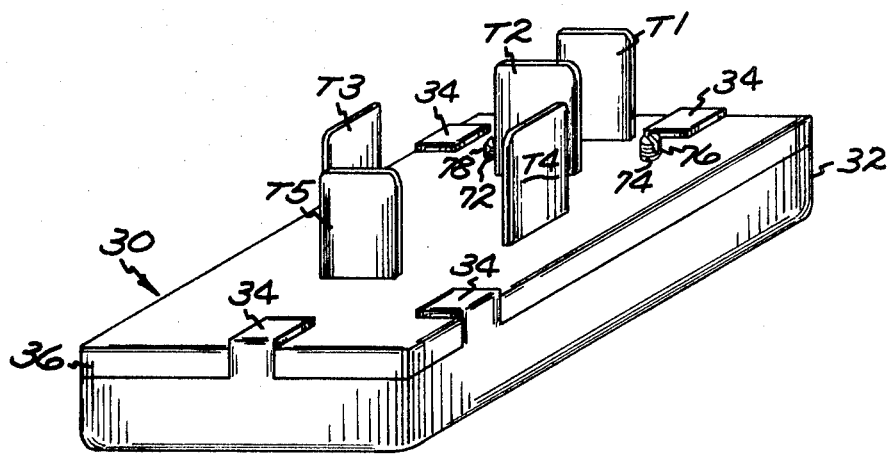
FIG. 5 is a pictorial view of a relay housing used in the FIGS. 1-2 apparatus and arranged to show the terminal configuration of the relay.
Figure 6:
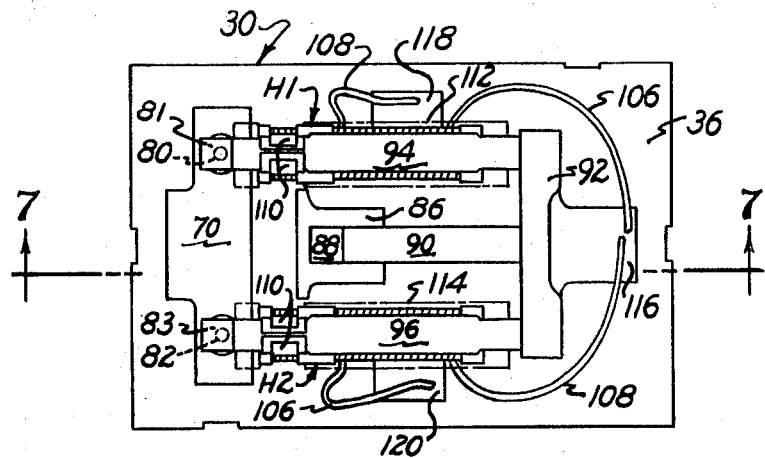
FIG. 6 is a top plan view of the relay with the cover removed.

Referring now to the drawings, as seen in FIGS. 1 and 2 the rectangular dashed line 10 represents a vehicle in which is mounted a master cylinder 12 on flange 14 in turn mounted on wall 16 of vehicle 10 by bolts 18 and 20. Master cylinder 12 comprises a first and second reservoir R1 and R2 into which extend through sidewall 22 respective sensor units S1 and S2. Bolt 20 also supports bracket 24 on which is mounted relay unit 30. As shown in FIG. 5, relay 30 comprises a can 32 having a plurality of tab portions 34 bent over to clampingly engage base member 36 of electrically insulative material. Extending through base member 36 are terminals T1 through T5. As will be explained in more detail below, terminal T1 is connected to ground by bending it over, as shown in FIG. 2, so that it engages can 30 and may conveniently be soldered thereto. In turn, can 30 may conveniently be welded to bracket 24 which is in electrical connection with the vehicle frame. Terminal T2 is connected by line L2 to a lamp LP preferably mounted in the dashboard of the vehicle. Terminal T3 is connected to sensor assembly S2 via line L3 while terminal T4 is connected to sensor assembly S1 via line L4. Lastly terminal T5 is connected to a power source, e.g. 12 volt supply, via line L5.

Figure 3:
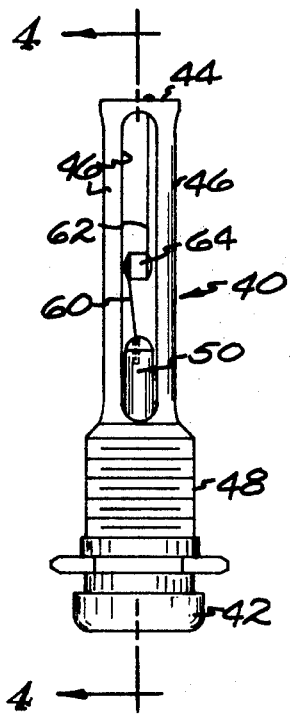
FIG. 3 is a top plan view of a probe used in the FIGS. 1-2 apparatus.
Figure 4:
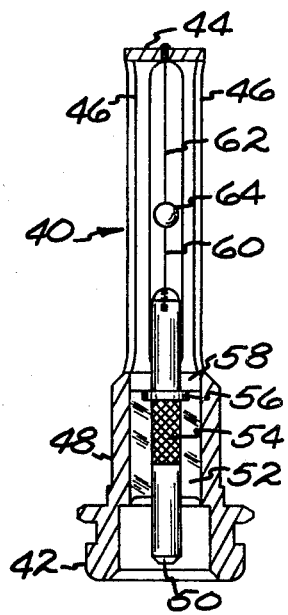
FIG. 4 is a cross sectional view of the probe taken on lines 4—4 of FIG. 3.

Sensor units S1 and S2 are of substantially identical construction thus only one such unit will be explained in detail. As seen in FIGS. 3 and 4, until S1 is a generally elongated cylindrical body 40 having a first open end 42 and a second closed end 44 with a plurality of axially extending slots or apertures 46 to permit virtually unimpeded flow of fluid therethrough. Suitable means are provided on body 40 for mounting the sensor in a reservoir such as thread portion 48. It should be noted that other mounting means could be employed if desirable, such as a snap in, bayonet type fitting or the like. Terminal pin 50 is telescopically received in the open end of body 40 and centrally fixed in place by electrically insulative epoxy 52. Terminal pin 50 is preferably provided with a roughened surface portion 54 which enhances the bond between the pin and the epoxy. An annular flange 56 located on pin 50 acts as a seating member and rests against washer shaped spacer 58. Pin 50 is provided with a bored hole in one end which receives an end of wire 60 and is electrically connected thereto as by soldering. An end of a second wire 62 is received in a bore in end 44 of body 40 and electrically connected as by soldering. The opposite ends of wires 60, 62 are attached, as by soldering, to sensor element 64. As will be observed in FIGS. 3 and 4, element 64 is a cylindrical body having a relatively small mass. Contact layers are provided on opposite sides thereof as by flame spraying onto the body of a layer of aluminum followed by a layer of copper as set forth in copending application Ser. No. 340, filed Jan. 2, 1970, assigned to the assignee of the instant application which issued July 11, 1972 as U.S. Pat. No. 3,676,211. Sensors made in accordance with the invention employed elements 64 having a diameter of 0.100 inches by 0.030 inches thick and were constructed of material having a positive temperature coefficient of resistivity with base resistance of 20 t0 35 ohms at a temperature of 25°C., and a threshold or anomaly temperature of 180°C. above which the resistance rises orders of magnitude within a few degrees centigrade. Leads 60, 62 are constructed of as fine wire as possible, typically in the order of 0.005 - 0.015 inches, consistent with structurally supporting element 64 so that they will not act as heat sinks, that is they have low thermal conductivity. For the size pills mentioned above a 0.010 copper-nickel alloy has been found to be suitable. In order to preclude corrosion due to the difference in electrical potential between housing 40 and pin 50, the entire assembly which projects into the reservoir, that is from mounting means 48 to end 44, is preferably coated with a thin layer of electrically insulating material. This layer is kept to a minimal thickness, e.g., 0.0002 to 0.0005 inches so that it has no substantial effect on the heat dissipating characteristics of element 64. Parylene D, a thermoplastic polymer of Union Carbide Corporation and Pyre-M.L. a registered trade name of E.I. du Pont de Nemours & Co. Inc. for a polyimide polymer varnish have been found to be suitable.

In applications in which the sensors are mounted in brake fluid it is desirable to have a sensor element with a high anomaly temperature, e.g. 180°, in order to prevent self heating of the elements at times when there is brake fluid in the reservoir due to the relatively high ambient temperatures which are normal in brake systems. The physical sizes of the elements are very small so that as long as the elements are in the brake fluid their heat is dissipated into the fluid thereby keeping the resistance in the low mode, i.e. 20 to 35 ohms; however, in the event the brake fluid level drops below the sensors, the elements will quickly self heat due to the difference in thermal dissipation with the resistance increase to greater than 500 ohms thereby effectively cutting off current flow therethrough.

Turning now to relay 30, reference may be had particularly to FIGS. 5–8. Base 36 is a generally rectangular plate of electrically insulative material and is provided with a plurality of apertures to receive therein terminals T1–T5 respectively. Terminal T1 projects downwardly from a transversely extending plate 70 in which are provided at opposite ends thereof bores 72, 74, threaded in plate 70, which receive respective set screws 76, 78 which in turn respectively mount electrical contacts 80, 82. It will be seen that the height of contacts 80, 82 above base plate 70 can be readily adjusted by turning of screws 76, 78.

Figure 9:
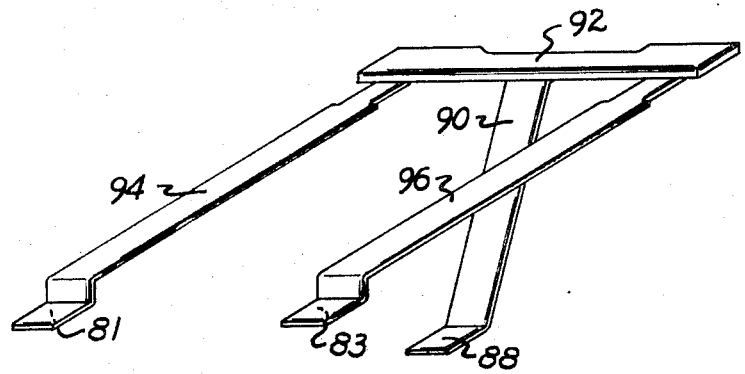
FIG. 9 is a pictorial view of the thermal element of the relay.
Figure 10:
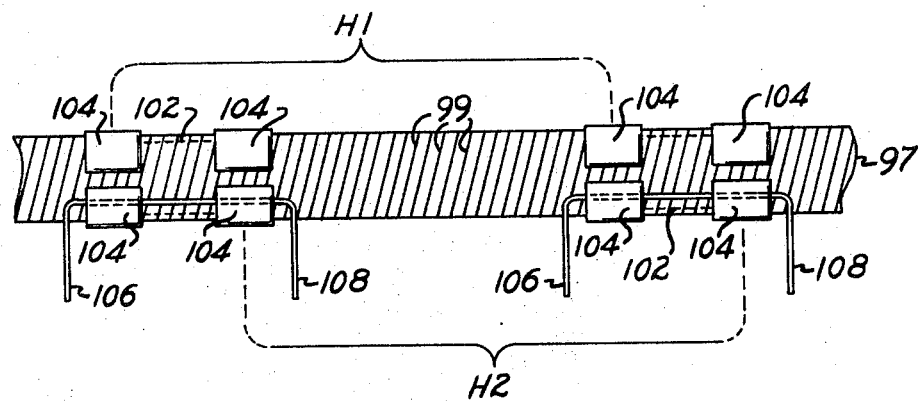
FIG. 10 is a top plan view with portions broken away, of partially completed heater assemblies.
Figure 11:
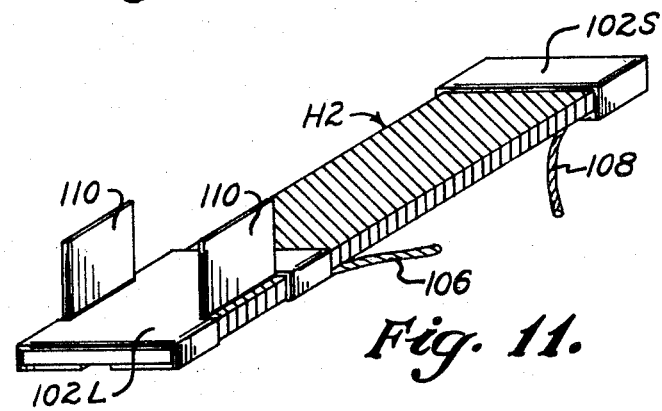
FIG. 11 is a pictorial top view of one such heater assembly.
Figure 12:
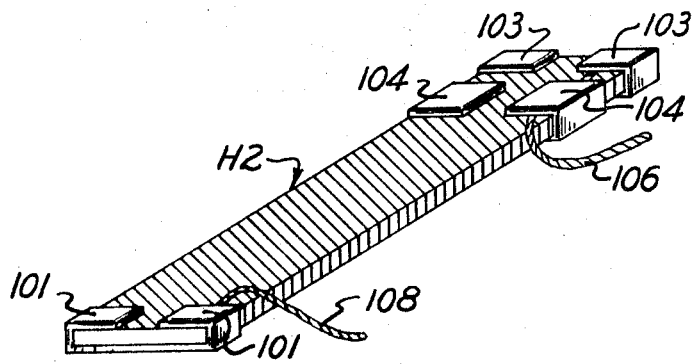
FIG. 12 is a pictorial bottom view of the FIG. 11 heater assembly turned 180°.

Thermal actuating assembly 84 is mounted on base plate 86 of terminal T2 by welding thereto one end 88 of leg 90 of suitable thermostatic material such as bimetal. The opposite end of leg 90 is attached to a transversely extending bar 92 at a location intermediate the ends thereof. In order to space bar 92 above base 36, end 88 of leg 90 is bent so that the remainder of the leg forms an acute angle with the top surface of base 36. Bar 92 is formed out of material which is a relatively poor thermal conductor such as steel, in order to provide a measure of thermal isolation along its length for a purpose which will be discussed infra. In some instances it may be preferred to employ a plastic material for bar 92 along with an electrical connection to provide even greater thermal isolation. Cantilever mounted from opposite ends of bar 92 are respective outer legs 94, 96 preferably of the same thermostatic material as that used for leg 90. The free distal end portion of legs 94, 96 serve as contacts and are adapted to move into and out of engagement with contacts 80, 82 respectively. It is preferred to provide a layer of low resistance material 81 and 83 respectively, such as silver to serve as movable contacts on the distal end portions of the outer legs. As seen in FIG. 9, the distal free end portions of legs 94, 96 may be bent into an L-shaped configuration if desired. Mounted on legs 94, 96 near the distal free end portion are respective heaters H1, H2. As can be best seen in FIG. 10 the heaters are formed by taking an elongated substrate 97 of reconstructed mica or similar electrically insulative material and a heater resistance wire 99 is helically wound about the substrate along its entire length. At spaced intervals central clamp portions 102 are placed with tabs 104 bent to clampingly engage the substrate. Prior to clamping of the tabs a lead wire having ends 106, 108 is placed intermediate the substrate and two of the tabs so that the wire will be tightly clamped against the resistance heater wire once tabs 104 are bent. The individual heater units are then severed as indicated in FIG. 10 into right and left hand units H2, H1, respectively. One such unit, H2, is shown in FIGS. 11 and 12. FIG. 12 is a view as seen in FIG. 10 and shows lead wire 108 extending from portion 101 of one tab 104 and lead wire 106 extending from tabs 103 and 104. It will be noted that the severing operation divides one set of tab portions 104 with sets of tab portions 101 and 103; or as seen in FIG. 11, central bracket portion 102 is divided into a long portion 102L and a short portion 102S. In FIG. 11, a view of unit H2 turned over and 180° relative to the FIG. 12 view, two upstanding ears 110 are seen extending from bracket 102L. These ears are bent to clampingly engage a portion of each of the outer legs 94, 96. Units H1 and H2 are identical except for the location of wire leads 106, 108 so that upon mounting each heater unit leads 106, 108 will be toward the outside on both legs. Interposed between each heater unit and its thermostatic leg is a thin piece of suitable electrically insulative material 112, 114 respectively such as a polyimide film.

Leads 106, 108 of heaters H1 and H2 respectively are both attached, as by soldering, to base plate 116 of terminal T5. Lead 108 of heater H1 is attached as by soldering, to base plate 118 of terminal T4 while lead 106 of heater H2 is similarly attached to base plate 120 of terminal T3.

Figure 7:
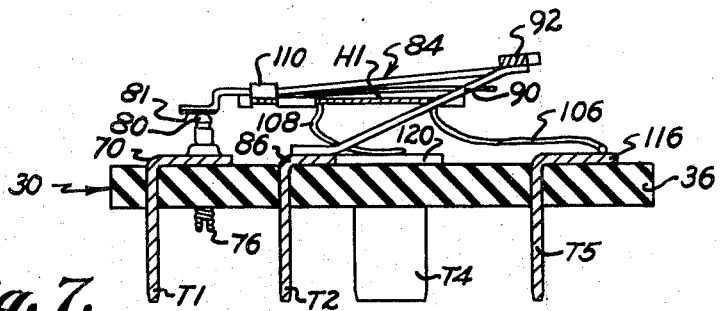
FIG. 7 is a cross sectional view of the relay taken on lines 7—7 of FIG. 6 showing one of the switches.
Figure 8:
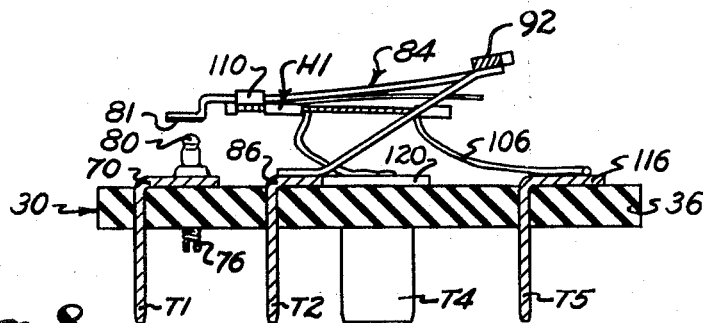
FIG. 8 is similar to FIG. 7 except showing the switch in the open contacts position.

As is well understood in the art, thermostatic legs 90, 94 and 96 all have a high and a low expansion side. The high expansion side is located on the lower side, as viewed in FIG. 9, on all three legs. Middle leg 90 serves as an ambient compensating leg, that is, a change in ambient will cause a deflection in the middle leg which offsets a like deflection in the outer legs 94, 96, thereby keeping relatively constant the contact pressure between contacts 80, 81 and 82, 83 respectively. For example, if ambient temperature increases this will cause leg 90 to bow in a concave configuration as seen in FIGS. 7 and 8 to raise the position of bar 92 and would tend to increase contact pressure. However, at the same time legs 94 and 96 bow in a concave configuration which raises the distal free end portions of legs 94, 96 offsetting the deflection of leg 90 so that the only motion that the contact portions 81, 83 have relative to stationary contacts 80, 82 is one of a slight sliding motion due to the different angle caused by bowing of legs 94, 96.

Energization of the heating elements however will cause further bowing of legs 94, 96 causing the normally closed contacts to open, as seen in FIG. 8. It should be noted that, advantageously, when the contacts are in the open position, that is when the heaters are energized, due to the bowing of legs 94, 96 the legs tend to move away from their respective heaters thereby avoiding the possibility of overheating of the thermostatic material and concomitant deleterious effects on calibration, life and the like.

Figure 13:
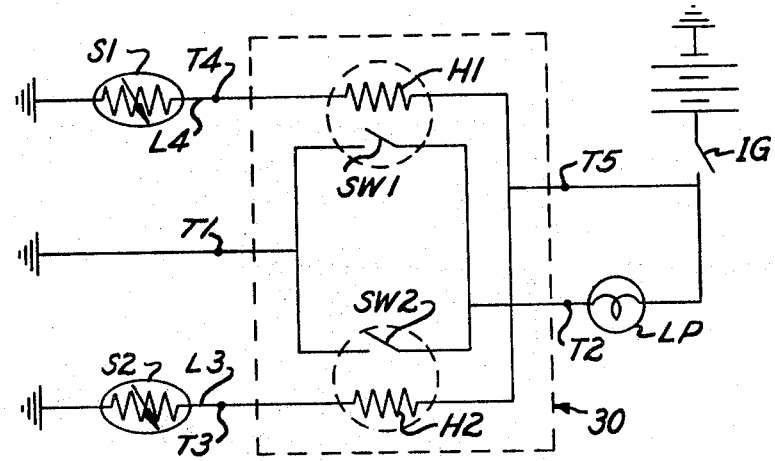
FIG. 13 is a schematic wiring diagram showing the sensing and indicating circuit according to the present invention.

Operation of the device will now be explained with particular reference to FIG. 13. Assuming the components of the system to be at an initial, deenergized condition with the temperature of the sensors at ambient and the sensors adequately immersed in filled master cylinder reservoirs, when the ignition switch 1G of the vehicle is first turned on the sensors are in their low resistance mode thereby permitting appreciable current flow through respective heaters H1 and H2. The normally closed switches SW1 and SW2 permit current to flow through lamp LP so that the operator of the vehicle has a positive indication that the indicating system is operational. After a momentary delay sufficient heat is generated by heaters H1 and H2 and transferred to respective thermal legs 94, 96 to cause them to deflect thereby opening switches SW1 and SW2 deenergizing lamp LP. The switches are maintained or locked in the contacts open position by the heaters as long as the ignition switch remains closed and as long as there is sufficient brake fluid in reservoirs R1 and R2 to dissipate the heat generated in the PTC elements keeping them in their low resistance mode. Turbulence of the brake fluid occasioned by the vehicle passing over rough terrain will not cause the PTC elements to go into the high resistance mode since the elements are out of the fluid only momentarily so that they do not become dry and the temperature does not increase above the anomaly point. Further, there is a thermal inertia in the switches which gives a slight time delay before the switches reclose. That is, once the heaters cease to generate heat it takes a short period of time for the thermal legs to cool sufficiently to deflect back to the contacts closed position. Thus energization of lamp LP is controlled by switches SW1, SW2 which in turn are controlled by the state of energization of heaters H1, H2. The energization of heaters H1, H2 is dependent upon the resistance level of the PTC elements of sensors S1, S2. That is, as mentioned above, the low resistance mode of the PTC elements is approximately 20-35 ohms. The resistance of each heater H1, H2 is approximately 55 ohms so that upon actuation of the circuit by closing the ignition switch the normally closed switches SW1, SW2 permit energization of lamp LP indicating to the operator that the system is operational. The low value of resistance of sensors S1 and S2 permit substantial current flow through heaters H1, H2 which, after a few seconds, transfer heat primarily by convection and radiation to legs 94, 96 causing them to deflect, opening switches SW1, SW2 and deenergizing lamp LP.

The relay, as best shown in FIGS. 5-9, has a unique construction and permits either switch to move into the contacts closed position independently of the other switch. Thus if the fluid level in either reservoir becomes to low exposing a PTC element it becomes dry and the element will be unable to dissipate the heat generated therein. In the dry state, the PTC element will self heat into the hot high resistance mode thus greatly decreasing the current to the serially connected heater. This will cause the respective switch to move into the contacts closed position energizing the lamp.

As mentioned above the PTC sensor elements are constructed of material having a low base resistivity or low resistance mode along with a steeply sloped resistivity v. temperature curve at temperatures above an anomaly or threshold temperature, or high resistance mode. The anomaly temperature is chosen high enough that changes in ambient temperature or in the temperature of the brake fluid during operation will not affect the sensor operation. For example, material having an anomaly temperature of approximately 180°C. has been found to be suitable for use in brake fluid up to 120°C. An example of such material is barium lead titanate doped with a rare earth, such as lanthanum, e.g., Ba Pb La TiO$_3$. As long as the PTC element is maintained in the brake fluid heat is dissipated from the element keeping it below its anomaly temperature. However, once the element is exposed, it is unable to dissipate heat as rapidly as it is generated by the current passing therethrough so that the temperature increases until it passes through the anomaly point when the resistance of the element increases by orders of magnitude within just a few degrees.

Thus it will be seen that the present invention offers many advantages including an inherently fail safe system. That is, an open sensor circuit will result in energization of the lamp. Further, brake fluid turbulence does not cause false tripping as in some alternate systems. The apparatus is of low cost particularly due to the steepness of the PTC slope and its high anomaly temperature which obviates the need for a sensitive, sophisticated switching device. Further, the large resistance change of the PTC element permits wide swings in dissipation condition while still providing a fluid and a loss of fluid indication. Also due to the PTC characteristics no supplemental voltage regulation is required. Since the sensor performance is not affected by liquid conductivity, the same sensor could be used for sensing other automotive liquids to result in further cost savings. The sharp increase in PTC resistance results in self regulation, that is the maximum temperature of the element is limited by the sharp increase in resistance. This eliminates the need to use a special current limiting lamp or other component during low liquid conditions. The fact that only three simple electromechanical components are required means that there are fewer possibilities of failure than in more complex systems.

Figure 14:
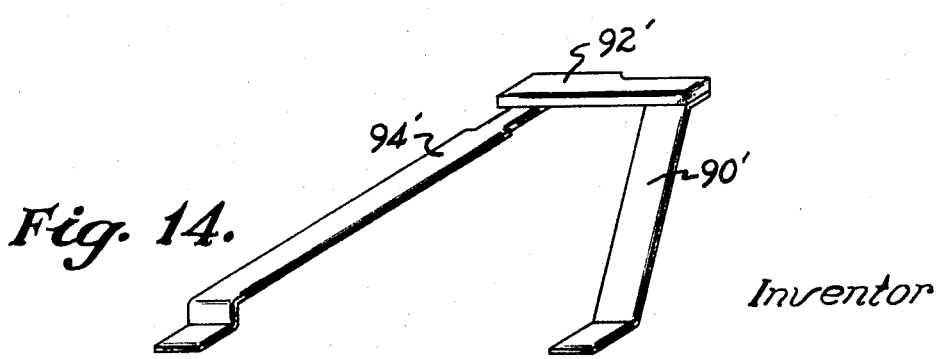
FIG. 14 is a pictorial view of a thermal element useful in a second embodiment of the invention.

In some cases, it may be desirable to employ a liquid level sensing system with only a single sensor input. FIG. 14 shows a thermal element useful in such a system comprising a single thermal leg 94' cooperating with ambient compensating leg 90' and thermally decoupled therefrom by supporting bar 92'. The circuit of FIG. 13 can be employed with a relay using this thermal leg but using only one heater, switch and thermistor assembly. Further, it will be appreciated that the liquid level sensing apparatus could be used with fluids other than brake fluids. Also in some applications it may be desirable to employ a solid state switch rather than the relay shown. In certain applications, it may also be preferred to employ other types of indication, such as meter or mechanical latch mechanism with a resettable button.

As many changes could be made in the above constructions without departure from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

I claim:

1. A vehicle having braking means including a master cylinder, means defining two reservoirs in the cylinder, a probe extending into each reservoir, a thermistor having a positive temperature coefficient with a low resistance mode at temperatures below an anomaly temperature and a high resistance mode at temperatures above the anomaly temperature mounted in each probe, switching means and indicating means mounted in the vehicle, the switching means switchable from one condition to another in response to a change in resistance of the thermistor from one resistance mode to the other resistance mode, the indicating means being actuated by the switch in one of its two conditions, the switching means comprises an electrically insulative base; stationary contact means mounted on the base; a generally W-shaped movable contact assembly including a center leg of thermostatic material cantilever mounted on the base and having a free end spaced from the base, a supporting bar extending transversely in opposite directions from the free end and substantially longer than the width of the center leg, a first and second outer leg of thermostatic material cantilever mounted on respective ends of the support bar, each being adapted to move into and out of engagement with the stationary contact means, and a heater assembly cantilever mounted on each outer leg; terminal means in the base for providing electrical connection to the heaters, stationary contact means and movable contact assembly, the heaters electrically coupled to respective thermistors and electrical power supply means for the thermistor and switch.

2. A vehicle according to claim 1 in which each thermistor has two leads attached to spaced portions of the thermistor and extending in generally opposite directions, the probes supporting the respective thermistors only by the thermistor leads thereby permitting brake fluid in the cylinder, when there is sufficient quantity in the cylinder, to inundate the respective thermistors to obtain optimum heat transfer between the thermistor and the fluid.

3. Fluid level indicating apparatus comprising: means defining a reservoir, a probe mounted to extend into the reservoir, a thermistor having a positive temperature coefficient of resistivity with a low resistance mode at temperatures below an anomaly temperature and a high resistance mode at temperatures above the anomaly temperature, the thermistor mounted in the probe and adapted to be inundated by fluid when a sufficient quantity is contained in the reservoir, switching means interconnnected with the thermistor, the switching means comprises a thermostatic element movable to and from first and second positions responsive to respective high and low resistance modes of the thermistor, heating means in heat transfer relation with the thermostatic element and electrically interconnected with the thermistor, the heating means generating sufficient heat to cause the thermostatic element to move from said one position to said second position when the thermistor is in the low resistance mode, the heating means generating insufficient heat to cause the thermostatic element to move from said one position to said second position when the thermistor is in the high resistance mode and indicating means energizable when the switching means is in one of the first and second conditions.

4. Apparatus according to claim 3 further including power supply means adapted to provide power to the apparatus and in which said first position is a closed circuit position and the said second position is an open circuit position, the indicating means including an electrical lamp energized when the thermostatic element is in the first closed circuit position whereby upon initial energization of the apparatus the lamp is energized giving positive indication that the apparatus is operative and upon continued energization heat from the heating means causes the thermostatic element to move to the second open circuit position deenergizing the lamp and maintaining it deenergized as long as the level of fluid in the reservoir indundates the thermistor keeping it in the low resistance mode.

5. Apparatus according to claim 3 in which the probe comprises a generally elongated body having an open mounting end and a closed end, means on the open mounting end for fixedly mounting the probe in a probe receiving aperture, a terminal pin and electrically insulative header means closing the open end of the body with the terminal pin electrically isolated from the body, axially extending apertures formed in the body to permit fluid to flow freely therethrough, two electrical leads of fine wire attached to spaced portions of the thermistor and respectively to the terminal pin and the closed end of the body.

6. Apparatus according to claim 5 in which the portion of the probe extending from the mounting means to the closed end, the electrical leads and the thermistor are all coated with a thin layer of corrosion resistant polymeric material.

7. Apparatus according to claim 5 in which the axial slots extend from the mounting portion of the body along the major portion of the body length toward the closed end.

8. Apparatus according to claim 3 further including brake fluid contained in the reservoir, the thermistor having an anomaly temperature of approximately 180°C.

9. Apparatus according to claim 1 in which each heater assembly comprises a substrate having two ends and composed of electrically insulative material, an electrical resistance wire wrapped about the substrate between its two ends, an electrical lead and a clamp located at each end, each clamp biasing a respective lead into electrical contact with a portion of the electrical resistance wire, one of the clamps having two arms extending therefrom in clamping engagement with an outer leg of the movable contact assembly near the free end thereof.

10. Apparatus according to claim 9 including a layer of electrical insulating material interposed between each outer leg and the respective heater assembly. electrical 11. Apparatus according to claim 3 in which the switching means includes a base of electrically insulative material, a stationary contact mounted on the base, a movable contact assembly comprising an ambient compensating thermostatic element cantilever mounted on the base with the free end spaced from the base, a supporting bar having a distal end extending transversely from the free end of the ambient compensating element, a thermostatic leg cantilever mounted on the distal end of the supporting bar and adapted to move into and out of engagement with the stationary contact, a heater assembly cantilever mounted on the thermostatic leg near its free end, and terminal means mounted in the base to provide electricl connection for the stationary contact, movable contact assembly and heater assembly.

12. Vehicular brake fluid level indicating apparatus comprising:
   a vehicle;
   a master cylinder mounted in the vehicle, the cylinder defining a fluid reservoir;
   a probe mounted in the cylinder and extending into the reservoir, the probe mounting a positive temperature coefficient (PTC) element;
   switching means mounted in the vehicle, the switching means including a thermal element, a heater mounted in heat exchange relation to the thermal element and serially connected to the PTC element; and
   an electrical circuit including indicating means, the thermal element adapted to energize and deenergize the circuit upon sufficient deflection of the thermal element.

13. A vehicle having braking means including a master cylinder, a probe extending into the cylinder, a temperature sensitive thermistor having a first resistance mode at temperatures below an anomaly temperature and a second resistance mode at temperatures above the anomaly temperature mounted in the probe, switching means and indicating means mounted in the vehicle, the switching means switchable from one condition to another in response to a change in resistance of the thermistor from one resistance mode to the other resistance mode, the indicating means being actuated by the switch in one of its two conditions, the switching means includes a base of electrically insulative material, a stationary contact mounted on the base, a movable contact assembly comprising an ambient compensating thermostatic element cantilever mounted on the base with the free end spaced from the base, a supporting bar having a distal end extending transversely from the free end of the ambient compensating element, a thermostatic leg cantilever mounted on the distal end of the supporting bar and adapted to move into and out of engagement with the stationary contact, a heater assembly cantilever mounted on the thermostatic leg near its free end and electrically coupled to the thermistor, terminal means mounted in the base to provide electrical connection for the stationary contact, movable contact assembly and and heater assembly and electrical power supply means for the thermistor and switch.

* * * * *